United States Patent

Pawlik et al.

Patent Number: 5,156,501
Date of Patent: Oct. 20, 1992

[54] ADJUSTABLE TORSION BAR CARTRIDGE FOR FACE MILLS

[75] Inventors: James A. Pawlik; Raymond Stephens, both of Sterling Heights, Mich.

[73] Assignee: GTE Valenite Corporation, Troy, Mich.

[21] Appl. No.: 741,848

[22] Filed: Aug. 7, 1991

[51] Int. Cl.⁵ .............................. B23C 5/24
[52] U.S. Cl. ...................... 407/36; 407/38; 407/48; 407/89
[58] Field of Search .............. 407/40, 42, 53, 34, 407/36–39, 44–48, 81, 83, 89, 88, 103, 104, 84, 90; 408/714, 156, 187, 188, 180

[56] References Cited

U.S. PATENT DOCUMENTS

| | | | |
|---|---|---|---|
| 2,962,800 | 12/1960 | Swenson | 407/89 X |
| 4,194,860 | 3/1980 | Hopkins | 407/36 X |
| 4,470,731 | 9/1984 | Erkfritz | 407/36 X |
| 4,631,994 | 12/1986 | Jester et al. | 407/83 X |
| 4,848,977 | 7/1989 | Kieninger | 407/89 X |
| 4,927,301 | 5/1990 | Reiterman | 407/45 X |

FOREIGN PATENT DOCUMENTS

| | | | |
|---|---|---|---|
| 39539 | 11/1981 | European Pat. Off. | 407/44 |
| 222156 | 5/1987 | European Pat. Off. | 407/40 |
| 2615913 | 10/1977 | Fed. Rep. of Germany | 407/36 |
| 426761 | 2/1975 | U.S.S.R. | 407/83 |

Primary Examiner—Larry I. Schwartz
Assistant Examiner—Kevin J. Carroll
Attorney, Agent, or Firm—Bill C. Panagos

[57] ABSTRACT

A face mill having one or more cartridges for adjustably supporting cutter inserts on the end face of the rotating tool body. Each cartridge has a convex arcuate surface seated against a concave arcuate seat surface formed on or in the milling tool body. A torsion bar is integrally extended from the cartridge parallel to the axis of the concave seat surface. Also, a manual adjustment screw is located perpendicular to the axis of rotation of the cartridge for applying an adjustment force to the cartridge in opposition to the action of the torsion leaf spring. The torsion bar applies a pre-load force to the cartridge. The manual adjustment screw exerts an opposing force that rotates the cartridge to a desired position for proper orientation of the associated cutter insert.

15 Claims, 3 Drawing Sheets

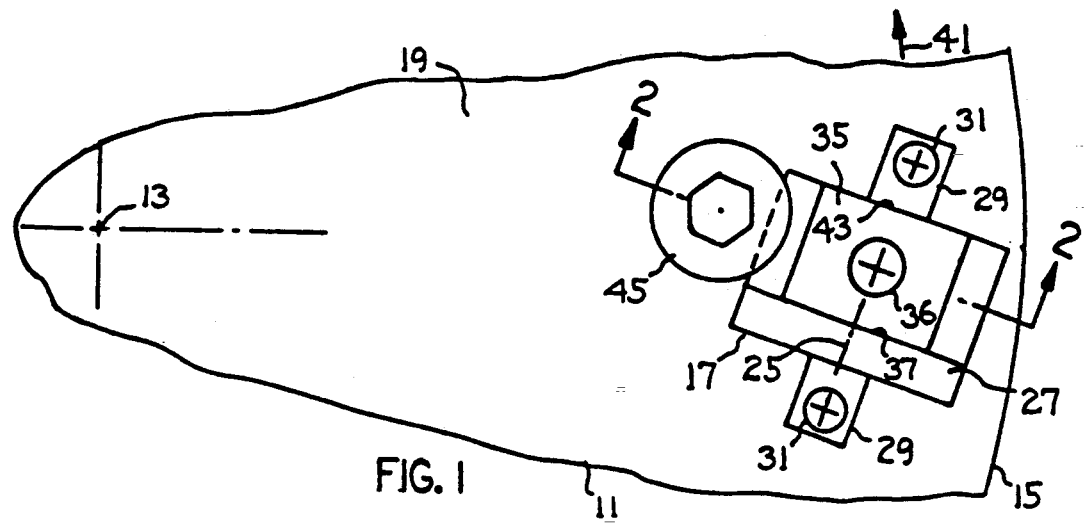
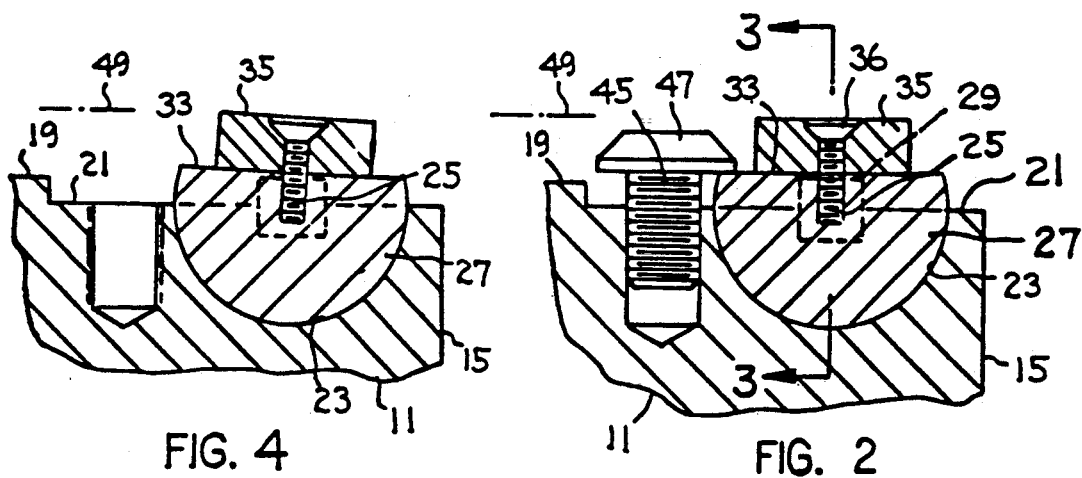
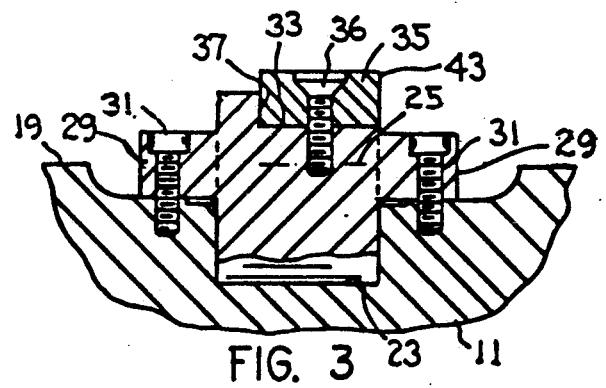

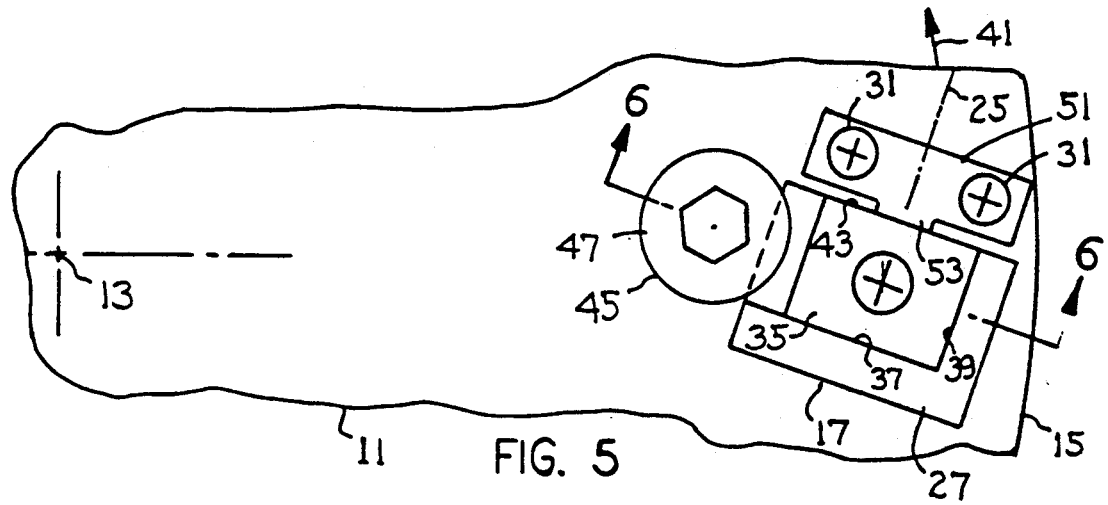
FIG. 5
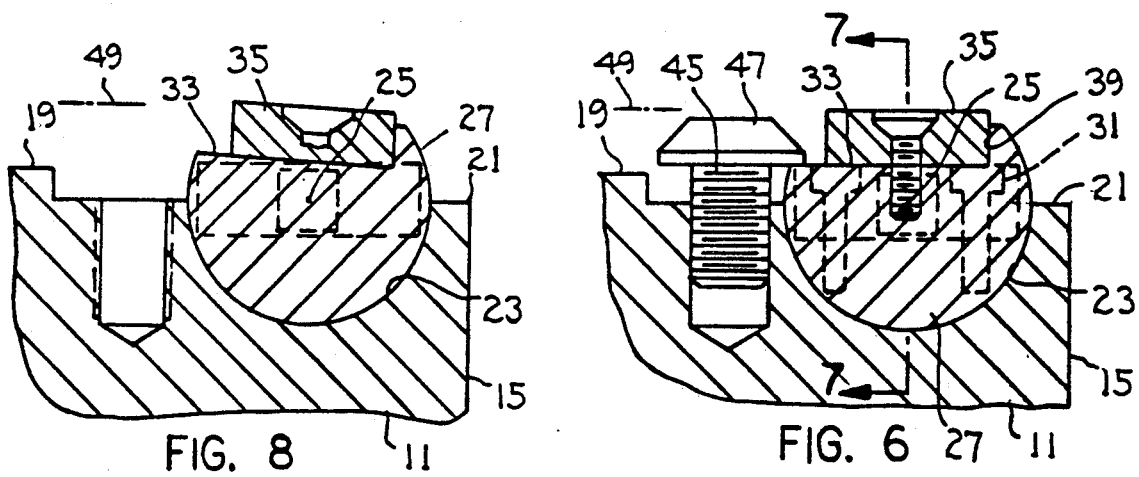
FIG. 8
FIG. 6
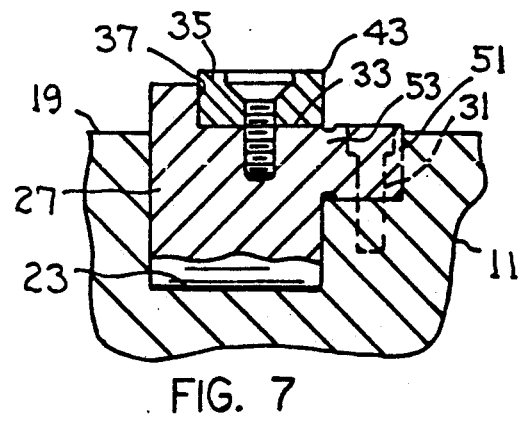
FIG. 7

ADJUSTABLE TORSION BAR CARTRIDGE FOR FACE MILLS

FIELD OF THE INVENTION

This invention relates to metal cutting or surface finishing machines, particularly face mills having cutter inserts mounted thereon for machining relatively smooth flat surfaces on a workpiece passing across the cutting edges of the inserts.

BACKGROUND OF THE INVENTION

U.S. Pat. No. 4,194,860 to David Hopkins shows a face milling cutter wherein the cutting action is performed by cutter inserts clamped to a rotatable tool body at spaced points around the tool body periphery. Each cutter insert comprises a flat rectangular cutter having truncated corners. The rectangular cutters are oriented on the end face of the tool body so that the truncated corners have wiping engagement with the machined surface, whereby the final surface is relatively smooth.

In order to obtain smooth surface finishes it is preferred that the milling tool cutters rotate in a single radial plane normal to the axis of the machine spindle. However, it often happens that there is a slight tilt between the cutter edge plane and the machine spindle centerline. The effect of the undesired spindle tilt can be compensated for by making the cutters as individual inserts and incorporating an adjustment feature into each insert.

U.S. Pat. No. 4,470,731 to Donald Erkfritz discloses a milling tool cutter insert construction having a system of multiple set screws for adjusting the orientation of the cutter insert so as to overcome the effects of undesired spindle tilt.

U.S. Pat. No. 4,927,301 to Lee Reiterman discloses a cutter insert cartridge usable on a boring bar having multiple screw adjustments for adjusting the positions of the cutting edge on the cutter insert. The cartridge has a convex arcuate surface contour seated in a concave arcuate seat or recess. One screw applies a spring pre-load to the cartridge for arcuate biasing it in one direction; an second manual adjustment screw can be operated to exert an opposing force on the cartridge, thereby overcoming the pre-load force and moving the cartridge to a desired position for properly orienting the associated cutter insert.

SUMMARY OF THE INVENTION

The present invention contemplates a face mill wherein the milling tool body has one or more arcuate concave segmental seats in its end face. A cutter insert-support cartridge is adjustably located on each seat so that each cartridge can be rockably adjusted to a position for overcoming undesired spindle tilt in the particular milling machine on which the invention is being used.

Each cartridge has a convex arcuate surface slidably positioned against the associated concave segmental seat surface, such that the cartridge can rock around the axis of the arcuate seat surface to adjust the position of the associated cutter insert. A torsion bar anchorage means extends from each cartridge to an anchorage point on the tool body for arcuately biasing the cartridge toward a predetermined position. Also, a manual adjustment screw is arranged perpendicular to the axis of rotation of the cartridge to apply an adjustment force in opposition to the spring leaf anchorage means.

By rotating the adjustment screw it is possible to rotate the cartridge around the arcuate seat axis, thereby adjusting the location or angulation of the cutting edge on the associate cutter insert.

An advantage of the proposed arrangement is that only a single screw needs to be adjusted in order to change the cutting edge position. Also, the system is suitable for achieving a relatively fine micrometer type adjustment of the cutter insert. Of further interest is the fact that the torsion bar anchorage means can be designed to give a relatively large pre-load force such that vibrational effects are not likely to disturb the adjusted position of the cutter insert.

THE DRAWINGS

FIG. 1 is a fragmentary plan view looking at the face of a milling tool embodying the invention.

FIG. 2 is a view taken along line 2—2 in FIG. 1.

FIG. 3 is a view taken on line 3—3 FIG. 2.

FIG. 4 is a view taken int eh same direction as FIG. 2, but showing the componentry in a partially assembled condition.

FIG. 5 is a view taken in the same direction as FIG. 1, but illustrating another form of the invention.

FIG. 6 is a fragmentary sectional view taken on line 6—6 in FIG. 5.

FIG. 7 is a view taken on line 7—7 in FIG. 6

FIG. 8 is a view taken in the same direction as FIG. 6, but illustrating the mechanism in a partially assembled condition.

DESCRIPTION OF A PREFERRED EMBODIMENT OF THE INVENTION

Figure 9:
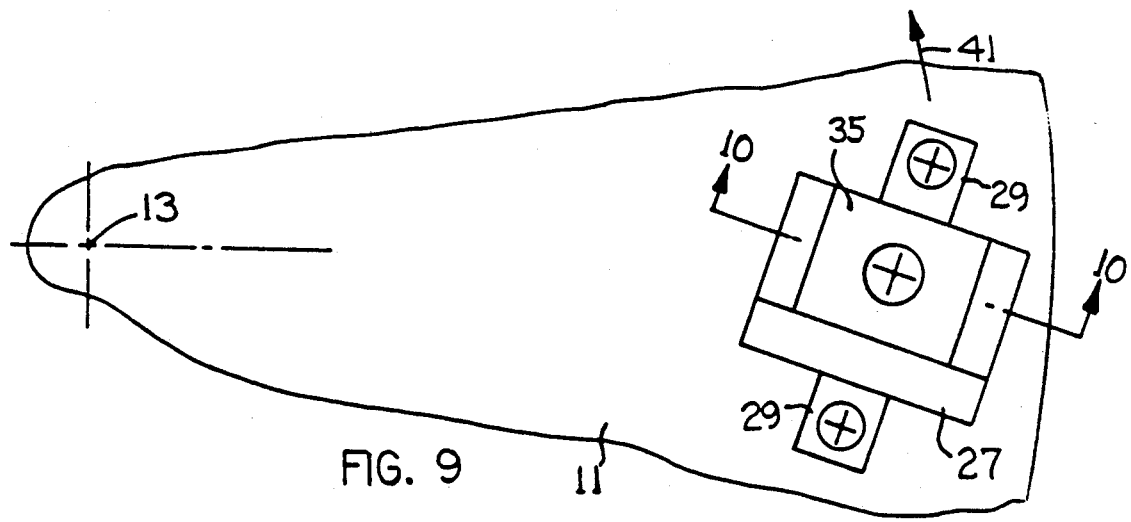
FIG. 9 is a view taken in the same direction as FIG. 1, but illustrating another form of the invention.

FIG. 1 fragmentarily shows a face milling tool that includes a milling tool body 11 having a rotational axis 13 and a cylindrical peripheral side surface 15. The drawing shows one illustrative cutter assembly 17 mounted on end face 19 of the milling tool body; additional cutter assemble is of a similar construction would, or could, be mounted on end face 19 of the tool body.

The illustrated cutter assembly comprises a concave arcuate segmental seat 23 formed in an undercut flat surface 21 of tool body end face 19. Seat 23 is an arcuate circular (cylindrical) surface having an axis 25. Rockably disposed on arcuate seat 23 is a cartridge 27.

Two ears 29 extend in opposite directions from the cartridge, as shown in FIG. 3. Each ear has a rectangular (essentially square) cross section as viewed in FIG. 2. Each ear is centered on axis 25, i.e. the flat side faces of each ear are essentially equidistant from axis 25. As shown in the drawing, each ear 29 is located in a slot in flat face 21, although the slot is not essential to performance of the system.

A clamp screw 31 extends through each ear 29 into tool body 11 so that the outer end portion of each ear is anchored to the tool body. The cartridge has a flat positioner face 33 adapted to receive a cutter insert 35 thereon. A screw 36 extends through the cutter insert into the cartridge to removably secure the insert to the cartridge. A shoulder 37 is formed on the cartridge in facing relation to the cutting load to preclude rotation of the cutter insert relative to screw 36.

Tool body 11 is rotatable in the direction of arrow 41 (FIG. 1), whereby edge 43 of cutter insert 35 engages the work to perform a cutting operation. Flat positioner face 33 is machined at a slight angle to the general plane of the undersurfaces of ears 29. Therefore, when the ears are originally clamped to face 21 (by screws 31) face 33 will be at a slight angle to face 21, as shown in FIG. 4.

A manual adjustment screw 45 is located alongside cartridge 27 so that its head 47 overlies positioner face 33 of cartridge 27. By turning screw 45 it is possible to apply a downward force on the cartridge (in FIG. 2), such that the cutting edge of insert 35 is brought into a cutting plane 49 that is parallel to the finished face that is milled. This plane may not be normal to rotational axis 13. This action compensates for any potential tilt of the machine spindle and tool body 11.

Ears 29 act as torsion springs or bars in the sense that downward movements of screw 45 causes head 47 to impart a torsional force to each ear 29. The torsional stress within each ear acts as a pre-load force to keep cartridge face 33 in contact with the head of screw 45. The screw can be turned to various positions to achieve different settings of cutter insert 35, i.e. different angulations of cutting edge 43. Each ear 29 forms a torsional connection between cartridge 27 and tool body 11.

Figures 10, 12:
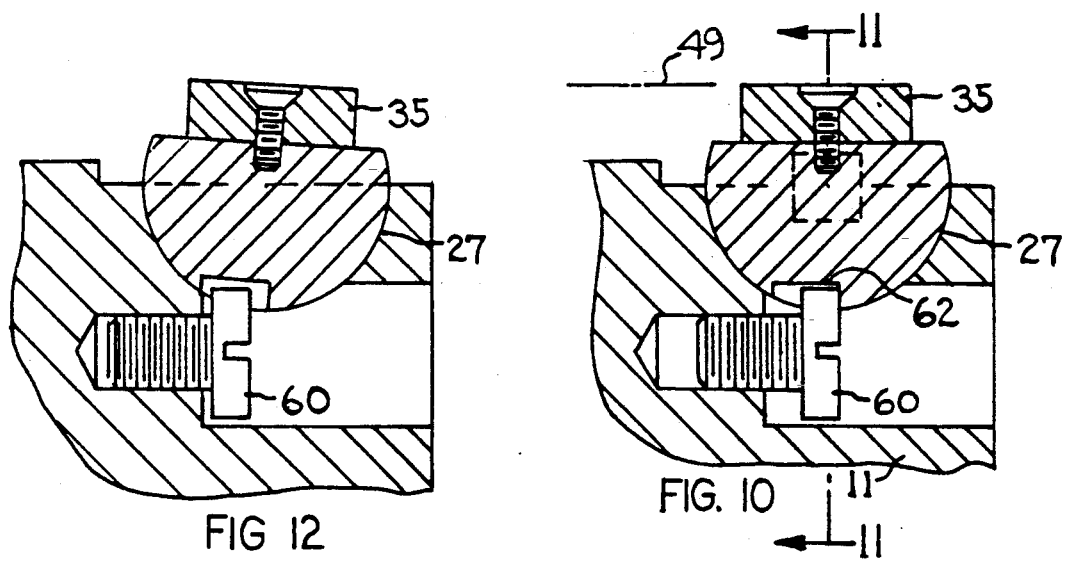
FIG. 10 is a fragmentary sectional view taken on line 10—10 in FIG. 9.
FIG. 12 is a view taken in the same direction as FIG. 10, but illustrating the mechanism in a partially assembled condition.
Figure 11:
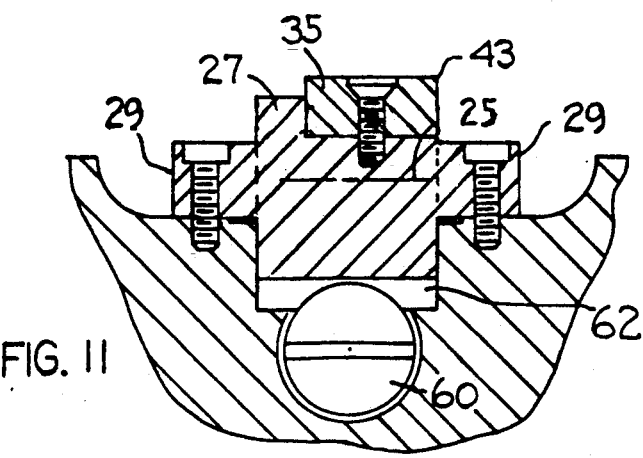
FIG. 11 is a view taken on lien 11—11 in FIG. 10.

An alternate manual adjustment is shown in FIG. 9 through 12. The manual adjustment screw is located below the cartridge 27 so that its head 60 engages in a slot 62 in the cartridge 27. By turning screw 60 it is possible to apply a rotational force on the cartridge (in FIG. 6), such that the cutting edge of insert 35 is brought into a cutting plane 49 that is parallel to the finished face that is milled. This plane may not be normal to rotational axis 13. This action compensates for any potential tilt of the machine spindle and tool body 11.

FIGS. 5 through 8 illustrate a second form of the invention. In this case the torsion bar means is formed by an anchoring pad 51 that is integrally joined to cartridge 27 via a relatively narrow rectangular neck structure 53. Two clamp screws 31 are extended through pas 51 into tool body 11 to anchor the pad to the tool body. Neck structure 53 forms a torsional connection between pad 51 and the cartridge body. Operationally the structure depicted in FIGS. 5 through 8 performs in essentially the same faction as the structure depicted in FIGS. 1 through 4.

In each forms of the invention cartridge 27 is connected to tool body 11 via a torsion bar means that is integral with the cartridge. When the torsion bar means is clamped to the tool body via screws 31 the cartridge is biased (pre-loaded) to a particular position on arcuate seat surface 23 (as shown in FIGS. 4 and 8). The single manual adjustment screw 45 or 60 can be operated to bias the cartridge from its pre-load position, thereby achieving a desired orientation of the cutting edge 43 on the cutter insert 35.

The drawings show two forms of the invention. However, the invention can be practiced in other forms.

What is claimed is:

1. A face mill comprising a milling tool body having a rotational axis and an end face extending generally transverse to the rotational axis; a concave arcuate segmental seat in said end face remote from said rotational axis; said seat having an arcuate seat surface centered on a second axis; a cutter insert-support cartridge slidably and rockably positioned in said segmental seat for arcuate adjustment around said second axis; torsion spring means integral with said cartridge for biasing said cartridge in a first arcuate direction; and a manual adjustment means for biasing said cartridge in a second arcuate direction.

2. The face mill of claim 1, wherein said torsion springs means is comprised of two ears extending in opposite directions form said cartridge; said ears being aligned on said second axis whereby operation of said manual adjustment means causes a torsion force to be exerted on said ears.

3. The face mill of claim 2, and further comprising a clamp screw extending through each ear into said tool body, whereby each ear forms a torsional connection between the tool body and the cartridge.

4. The face mill of claim 2, wherein each ear has a rectangular cross-section taken in a plane normal to the axis of the arcuate seat surface.

5. The face mill of claim 2, wherein said manual adjustment means comprises a single headed screw extending into the milling tool body normal to the axis of the arcuate seat surface.

6. The face mill of claim 1, wherein said torsion spring means comprises an anchoring pad positioned on the tool body alongside the cartridge and a neck structure extending between the cartridge and the pad; said pad and neck structure being integral with the cartridge, whereby operation of said manual adjustment means causes a torsion force to be exerted on the neck structure.

7. The face mill of claim 6, and further comprising two clamp screws extending through said pad into the tool body, whereby the neck structure forms a torsional connection between the tool body and the cartridge.

8. The face mill of claim 6, wherein said neck structure has a square cross section.

9. The face mill of claim 6, wherein said manual adjustment means comprises a head adjustment screw extending into the tool body normal to the axis of the arcuate seat surface.

10. A face mill comprising a milling tool body having a rotational axis and an end face extending generally transverse to the rotational axis; means forming an arcuate seat surface at the end face of the tool body; an cutter insert-support cartridge slidably positioned on said seat surface for rotary adjustment around the seat axis; said cartridge having a flat positioner face adapted to receive a cutter insert thereon; torsion bar means integral with said cartridge for biasing said cartridge in a first arcuate direction around the seat axis; and a manual adjustment means for biasing said cartridge in a second arcuate direction around the seat axis; said manual adjustment means comprising an adjustment screw extending into the tool body normal to the seat axis, said adjustment screw having a head overlying the flat positioner face of the cartridge whereby rotation of the adjustment screw enables said head to apply an adjusting force to the cartridge; said torsion bar means comprising at least one torsion element extending from the cartridge along the seat axis, and clamp screw means extending through each said torsion element into the tool body whereby one portion of the torsion element is anchored to the tool body and another portion of the torsion element is anchored to the cartridge.

11. The face mills of claim 10, wherein there are two torsion elements extending in opposite directions from said cartridge, and a clamp screw extending through each torsion element into the tool body.

12. The face mill of claim 10, wherein there is a single torsion element extending from the cartridge; said single torsion element comprising an anchoring pad positioned on the tool body and a neck structure extending between the cartridge and the pad; two clamp screws extending through said pad into the tool body; said pad and neck structure being integral with the cartridge, whereby rotation of the adjustment screw causes a torsion force to be exerted on the neck structure.

13. A face mill comprising a milling tool body having a rotational axis and an end face extending generally transverse to the rotational axis; means forming an arcuate seat surface at the end face of the tool body; a cutter insert-support cartridge slidably positioned on said seat surface for rotary adjustment around the seat axis; said cartridge having a flat positioner face adapted to receive a cutter insert thereon; torsion bar means integral with said cartridge for biasing said cartridge in a first arcuate direction around the seat axis; and a manual adjustment means for biasing said cartridge in a second arcuate direction around the seat axis; said manual adjustment means comprising an adjustment screw extending into the tool body normal to the seat axis, said adjustment screw having a head that engages a slot int eh cartridge body whereby rotation of the adjustment screw enables said head to apply an adjusting force to the cartridge; said torsion bar means comprising at least one torsion element extending from the cartridge along the seat axis, and clamp screw means extending through each said torsion element into the tool body whereby one portion of the torsion element is anchored to the tool body and another portion of the torsion element is anchored to the cartridge.

14. The face mills of claim 13, wherein there are two torsion elements extending in opposite directions from said cartridge, and a clamp screw extending through each torsion element into the tool body.

15. The face mill of claim 13, wherein there is a single torsion element extending from the cartridge; said single torsion element comprising an anchoring pad positioned on the tool body and a neck structure extending between the cartridge and the pad; two clamp screws extending through said pad into the tool body; said pad and neck structure being integral with the cartridge, whereby rotation of the adjustment screw causes a torsion force to be exerted on the neck structure.

* * * * *